US010637313B2

(12) United States Patent
Ulbrich et al.

(10) Patent No.: US 10,637,313 B2
(45) Date of Patent: *Apr. 28, 2020

(54) ROTOR, METHOD FOR PRODUCING A ROTOR, ASYNCHRONOUS MACHINE, AND VEHICLE

(71) Applicant: Bayerische Motoren Werke Aktiengesellschaft, Munich (DE)

(72) Inventors: Holger Ulbrich, Munich (DE); Manfred Siegling, Munich (DE); Josef Lichtinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/001,121

(22) Filed: Jun. 6, 2018

(65) Prior Publication Data

US 2018/0287444 A1    Oct. 4, 2018

Related U.S. Application Data

(63) Continuation of application No. PCT/EP2016/076334, filed on Nov. 2, 2016.

(30) Foreign Application Priority Data

Dec. 8, 2015    (DE) .......................... 10 2015 224 579

(51) Int. Cl.
*H02K 1/28*      (2006.01)
*H02K 15/00*    (2006.01)
(Continued)

(52) U.S. Cl.
CPC ............... *H02K 1/28* (2013.01); *H02K 1/26* (2013.01); *H02K 15/0012* (2013.01); *H02K 17/165* (2013.01)

(58) Field of Classification Search
CPC ..................... H02K 17/165; H02K 15/0012
See application file for complete search history.

(56) References Cited

U.S. PATENT DOCUMENTS

| 4,309,635 A | 1/1982 | Sei et al. |
| 5,419,217 A | 5/1995 | Umezawa et al. |

(Continued)

FOREIGN PATENT DOCUMENTS

| CN | 102651591 A | 8/2012 |
| CN | 102891572 A | 1/2013 |

(Continued)

OTHER PUBLICATIONS

International Search Report (PCT/ISA/210) issued in PCT Application No. PCT/EP2016/076333 dated Jan. 26, 2017 with English translation (seven pages).

(Continued)

*Primary Examiner* — Dang D Le
(74) *Attorney, Agent, or Firm* — Crowell & Moring LLP

(57) ABSTRACT

A rotor for an asynchronous machine includes a laminated core and a short-circuit cage which is at least partially integrated in the laminated core, in which the short-circuit cage is made of rods having or made from a first electrically conductive material and short-circuit rings having or made from a second electrically conductive material. A support ring is provided on at least one of the short-circuit rings and is in mechanical contact therewith. The at least one short-circuit ring and/or the support ring has a contour for creating the mechanical contact, and the mechanical contact is a press fit.

16 Claims, 5 Drawing Sheets

(51) Int. Cl.
*H02K 17/16* (2006.01)
*H02K 1/26* (2006.01)

(56) References Cited

U.S. PATENT DOCUMENTS

| | | | | |
|---|---|---|---|---|
| 5,952,764 | A * | 9/1999 | Nakamura | B22D 19/0054 310/211 |
| 7,174,806 | B2 * | 2/2007 | Brackett | F16F 15/315 165/185 |
| 2007/0247015 | A1 | 10/2007 | Dellinger | |
| 2012/0217837 | A1 | 8/2012 | Kleber | |
| 2012/0293036 | A1 | 11/2012 | Kleber et al. | |
| 2013/0020899 | A1 | 1/2013 | Kleber | |
| 2014/0132105 | A1 * | 5/2014 | Kleber | H02K 15/0012 310/211 |
| 2014/0368082 | A1 | 12/2014 | Barton | |
| 2016/0352200 | A1 | 12/2016 | Kaneda et al. | |

FOREIGN PATENT DOCUMENTS

| | | |
|---|---|---|
| DE | 88 03 915 U1 | 5/1988 |
| DE | 43 08 683 A1 | 9/1994 |
| DE | 691 04 016 T2 | 1/1995 |
| DE | 199 04 481 A1 | 8/2000 |
| DE | 102 58 029 A1 | 7/2003 |
| DE | 10 2012 208 006 A1 | 11/2012 |
| DE | 10 2013 218 473 A1 | 3/2015 |
| DE | 10 2013 221 795 A1 | 4/2015 |
| DE | 10 2015 102 420 A1 | 8/2015 |
| DE | 10 2014 208 887 A1 | 11/2015 |
| EP | 1 347 560 A1 | 9/2003 |
| EP | 2 804 297 A2 | 11/2014 |
| JP | 2004-236456 A | 8/2004 |
| JP | 2013-240234 A | 11/2013 |
| WO | WO 2013/172120 A1 | 11/2013 |
| WO | WO 2015/129421 A1 | 9/2015 |

OTHER PUBLICATIONS

German-language Written Opinion (PCT/ISA/237) issued in PCT Application No. PCT/EP2016/076333 dated Jan. 26, 2017 (seven pages).

German-language Search Report issued in counterpart German Application No. 10 2015 224 577.2 dated Oct. 18, 2016 with partial English translation (13 pages).

International Search Report (PCT/ISA/210) issued in PCT Application No. PCT/EP2016/076334 dated Jan. 26, 2017 with English translation (seven pages).

German-language Written Opinion (PCT/ISA/237) issued in PCT Application No. PCT/EP2016/076334 dated Jan. 26, 2017 (eight pages).

German-language Search Report issued in counterpart German Application No. 10 2015 224 579.9 dated Oct. 18, 2016 with partial English translation (13 pages).

International Search Report (PCT/ISA/210) issued in PCT Application No. PCT/EP2016/076516 dated Jan. 26, 2017 with English translation (seven pages).

German-language Written Opinion (PCT/ISA/237) issued in PCT Application No. PCT/EP2016/076516 dated Jan. 26, 2017 (seven pages).

German-language Search Report issued in counterpart German Application No. 10 2015 224 574.8 dated Oct. 18, 2016 with partial English translation (12 pages).

Chinese-language Office Action issued in counterpart Chinese Application No. 201680050370.3 dated Mar. 19, 2019 with English translation (13 pages).

* cited by examiner

ROTOR, METHOD FOR PRODUCING A ROTOR, ASYNCHRONOUS MACHINE, AND VEHICLE

CROSS REFERENCE TO RELATED APPLICATIONS

This application is a continuation of PCT International Application No. PCT/EP2016/076334, filed Nov. 2, 2016, which claims priority under 35 U.S.C. § 119 from German Patent Application No. 10 2015 224 579.9, filed Dec. 8, 2015, the entire disclosures of which are herein expressly incorporated by reference.

This application contains subject matter related to U.S. application Ser. Nos. 16/001,097 and 16/001,137 both entitled "Rotor, Method for Producing a Rotor, Asynchronous Machine, and Vehicle" filed on even date herewith.

BACKGROUND AND SUMMARY OF THE INVENTION

The present invention relates to a rotor, a method for producing a rotor, an asynchronous machine and a vehicle. The present invention relates, in particular, to a rotor for an asynchronous machine, a method for producing a rotor for an asynchronous machine, an synchronous machine, in particular for a drive of a vehicle, and a vehicle, in particular a passenger car and/or a hybrid vehicle.

Asynchronous machines are used in many technical applications, in particular when providing drive to vehicles and their components. Such machines are also referred to as three-phase asynchronous machines or three-phase induction machines. In such machines, a rotor and a stator interact with one another via rotational magnetic fields, wherein in the generator mode the rotor leads the stator rotational field, and in the motor mode the rotor lags the stator rotational field.

In the case of passive asynchronous machines, the rotor is constructed by a short-circuit rotor or cage rotor. Such a rotor is composed of a laminated core, in particular of an iron laminated core with grooves constructed therein, wherein the laminations are electrically insulated from one another. Rods are usually introduced into the grooves in the laminated core and electrically short-circuited by way of short circuit rings, which can be done by means of a casting process.

It is problematic that substitution of materials in order to improve the electrical conductance values, on the one hand, and increase the mechanical stability, on the other, cannot be carried out with known production methods, or can only be carried out with considerable additional expenditure in terms of material and costs.

The invention is based on the object of specifying a rotor for an asynchronous machine, which rotor makes the design and the operation of an asynchronous machine more reliable, without increasing expenditure during production. In addition, the invention is based on the object of specifying a corresponding production method for a rotor, an asynchronous machine and a vehicle and correspondingly developing said method.

The object on which the invention is based is achieved according to the invention with a rotor for an asynchronous machine, a method for producing a rotor for an asynchronous machine, an asynchronous machine so produced, and a vehicle with the asynchronous machine, in accordance with embodiments of the invention.

According to one aspect of the present invention, a rotor is provided for an asynchronous machine, comprising a laminated core and a short-circuit cage (also known as a "squirrel" cage) which is at least partially integrated into the laminated core, in which (i) the short-circuit cage is constructed with rods made with or from a first electrically conductive material and short-circuit rings made with or from a second electrically conductive material, (ii) a support ring is constructed on at least one of the short-circuit rings in mechanical contact therewith, (iii) a respective short-circuit ring and/or a respective support ring has a contour for forming the mechanical contact, and (iv) a respective mechanical contact is constructed as a press-fit for a positively locking and/or a frictionally locking connection. By way of the measures provided according to the invention and, in particular, by the construction of a respective mechanical contact via a contour in the manner of a press-fit on at least one of a respective short-circuit ring and a respective support ring, a short-circuit ring can be mechanically stabilized with simple mounting of a support ring on the respective short-circuit ring as an end ring with particularly simple measures and at the same time with a high level of reliability.

In one preferred development of the rotor according to the invention, the mechanical stabilization of a respective short-circuit ring is increased by a respective support ring in that a respective support ring is constructed as a structure which is positively locking and/or frictionally locking and, in particular, pressed on to the respective short-circuit ring. By virtue of these measures, the centrifugal loading can be applied to the support ring and compensated during the operation of the rotor in order to stabilize the respective short-circuit ring.

In another advantageous development of the rotor according to the invention, the underlying production process is simplified by virtue of the fact that a respective contour is constructed entirely or partially as a structure which is integral with the respective support ring and/or with the respective short-circuit ring.

As an alternative, a respective contour can, however, also be constructed entirely or partially as a structure which is added subsequently to the respective support ring and/or to the respective short-circuit ring.

In order to increase further the degree of mechanical coupling via the mechanical contact between the respective support ring and the respective short-circuit ring, it is possible, according to another advantageous embodiment of the rotor according to the invention, to provide that a respective contour is constructed with a surface profile, with one or more recesses and/or with one or more projections for forming and/or for assisting the mechanical contact.

A particularly high degree of mutual mechanical interaction and stabilization between a respective short-circuit ring and a respective support ring occurs, in particular, when a respective short-circuit ring and a respective support ring are constructed with contours which cooperate and/or are at least partially complementary to one another.

A particularly high level of mechanical stabilization of the rotor according to the invention also arises when a respective support ring is constructed entirely or partially on the outer circumference on the respective short-circuit ring and/or entirely or partially embedded in the respective short-circuit ring.

Since with respect to the support ring the electrical properties of the short-circuit ring are, depending on the positioning in relation to the short-circuit ring, not significant, the possibility is provided of a more wide-ranging selection of materials, in particular with respect to stabilizing the short-circuit ring with respect to large centrifugal forces, in particular in the case of untrue running.

Therefore, according to an alternative embodiment of the rotor according to the invention, a respective support ring is constructed with or from a material from the group of materials which comprises metallic materials, ceramic materials, plastics, composites, in particular with or from glass materials and/or carbon fiber materials, and combinations thereof.

Alternatively, a support ring can also be constructed with or from the same material as the respective short-circuit ring.

The stabilization of the short-circuit ring or rings in mechanical terms by the use of a support ring also permits use of material combinations with respect to the rods and/or the short-circuit rings, particularly taking into account the respective electrical conductivity and, if appropriate, without particular focus on the mechanical stability of the short-circuit ring because according to the invention the latter is stabilized mechanically by the support ring.

It is therefore, in particular, possible that (i) the rods are constructed in or with a cast and/or joined structure, (ii) one or more of the short-circuit rings are embodied as end rings, (iii) the first material has a higher electrical conductivity than the second material, (iv) the second material has a higher mechanical strength and/or stability than the first material, (v) the first material and/or the second material have/has a material from the group consisting of aluminum, copper, silver and combinations and alloys thereof, and/or (vi) the first material is or has copper or a copper alloy, and the second material is or has aluminum or an aluminum alloy.

According to another aspect of the present invention, a method for producing a rotor for an asynchronous machine is provided.

Such an asynchronous machine is constructed with a laminated core and at least one short-circuit cage which is partially integrated into the laminated core. According to the invention, in the production method, the short-circuit cage is constructed with (a) rods which are constructed with or from a first electrically conductive material, and (b) with short-circuit rings which are constructed with or from a second electrically conductive material. At least one of the short-circuit rings is constructed in mechanical contact therewith with a support ring. In this context, a respective short-circuit ring and/or a respective support ring is provided with a contour in order to form the mechanical contact, and a respective mechanical contact is constructed as a press-fit for a positively locking and/or a frictionally locking connection. As result, with the production method according to the invention, a support ring is constructed on at least one of the short-circuit rings and in mechanical contact therewith, and the mechanical contact is implemented via a contour on at least one of the respective short-circuit ring and the respective support ring, as a press-fit, a particularly high level of mechanical integrity of the produced rotor is obtained, specifically even in the case of high centrifugal loading and partial untrue running.

In one preferred development of the production method according to the invention, the mechanical integrity and durability of the produced rotor is increased by virtue of the fact that a respective support ring is constructed as a structure which is positively locking and/or frictionally locking and, in particular, pressed on to the respective short-circuit ring.

Particularly simple production occurs if a respective contour is entirely and/or partially constructed as a structure which is integral with the respective support ring and/or with the respective short-circuit ring.

As an alternative, it may also be advantageous if a respective contour is added entirely or partially as a subsequent structure to the respective support ring and/or to the respective short-circuit ring.

In addition, the mechanical interaction between the support ring and the short-circuit ring can be improved for the sake of increased mechanical stability in that, according to a further preferred embodiment of the method according to the invention, a respective contour is constructed with a surface profile, with one or more recesses and/or with one or more projections for forming or assisting the mechanical contact.

In addition, it may be advantageous if both the short-circuit ring and the support ring which interacts with the short-circuit ring are both constructed with a contour, in particular if a respective short-circuit ring and a respective support ring are constructed with contours which cooperate and/or are at least partially complementary to one another.

In one advantageous development of the production method according to the invention, in order to achieve a particularly high level of mechanical stability, a respective support ring is entirely or partially constructed on the outer circumference of the respective short-circuit ring and/or entirely or partially embedded in the respective short-circuit ring.

Material aspects can also be taken into account in order to increase the stability of the structure to be produced.

This can be done, for example, in that, according to one preferred embodiment of the production method, a respective support ring is constructed with or from a material from the group of materials consisting of metallic materials, alloys, ceramic materials, plastics, composites, in particular with or from glass materials and/or carbon fiber materials, and combinations thereof.

As an alternative to this, a support ring can also be constructed with or from the same material as the respective short-circuit ring.

According to further alternatives of the production method according to the invention, there may be provision that (i) the rods are constructed in or with a cast and/or joined structure, (ii) one or more of the short-circuit rings are embodied as end rings, (iii) a material with a higher electrical conductivity than the second material is used as the first material, (iv) a material with a higher mechanical strength and/or stability than the first material is used as the second material, (v) a material from the group consisting of aluminum, copper, silver and combinations and alloys thereof is used as the first material and/or as the second material and (vi) in particular, copper or a copper alloy is used as the first material, and aluminum or an aluminum alloy is used as the second material.

The method according to the invention is configured in a particularly economical way according to one advantageous development if a respective short-circuit ring is constructed by a casting process using a mold, and at the same time the mold has a complement of the contour of the short-circuit ring, and in this way when the short-circuit ring is cast it is also cast in an integral fashion with the contour.

The present invention also provides an asynchronous machine, in particular for the drive and/or as a generator of a vehicle. The asynchronous machine according to the invention has a rotor according to the invention and a stator.

In addition, the present invention provides a vehicle, in particular a passenger car, battery-operated electric vehicle and/or a hybrid vehicle. The vehicle comprises an asynchronous machine which is constructed according to the invention and which is constructed as part of a drive and/or of a generator of the vehicle.

The asynchronous machine according to the invention can also be used in any other devices as a drive and/or as a generator component, e.g. in working machines or machine tools, in particular in a circular saw, in pumps, e.g. water pumps, in hydraulic generators and wind-powered generators and the like.

Other objects, advantages and novel features of the present invention will become apparent from the following detailed description of one or more preferred embodiments when considered in conjunction with the accompanying drawings.

DETAILED DESCRIPTION OF THE DRAWINGS

Exemplary embodiments of the invention are described in detail below with reference to FIGS. 1 to 5. Identical and equivalent as well as identically or equivalently acting elements and components are denoted by the same reference symbols. The detailed description of the denoted elements and components is not given in every case of their occurrence.

The presented features and further properties can be separated from one another in any desired form and combined with one another in any desired form without departing from the core of the invention.

Figure 1:
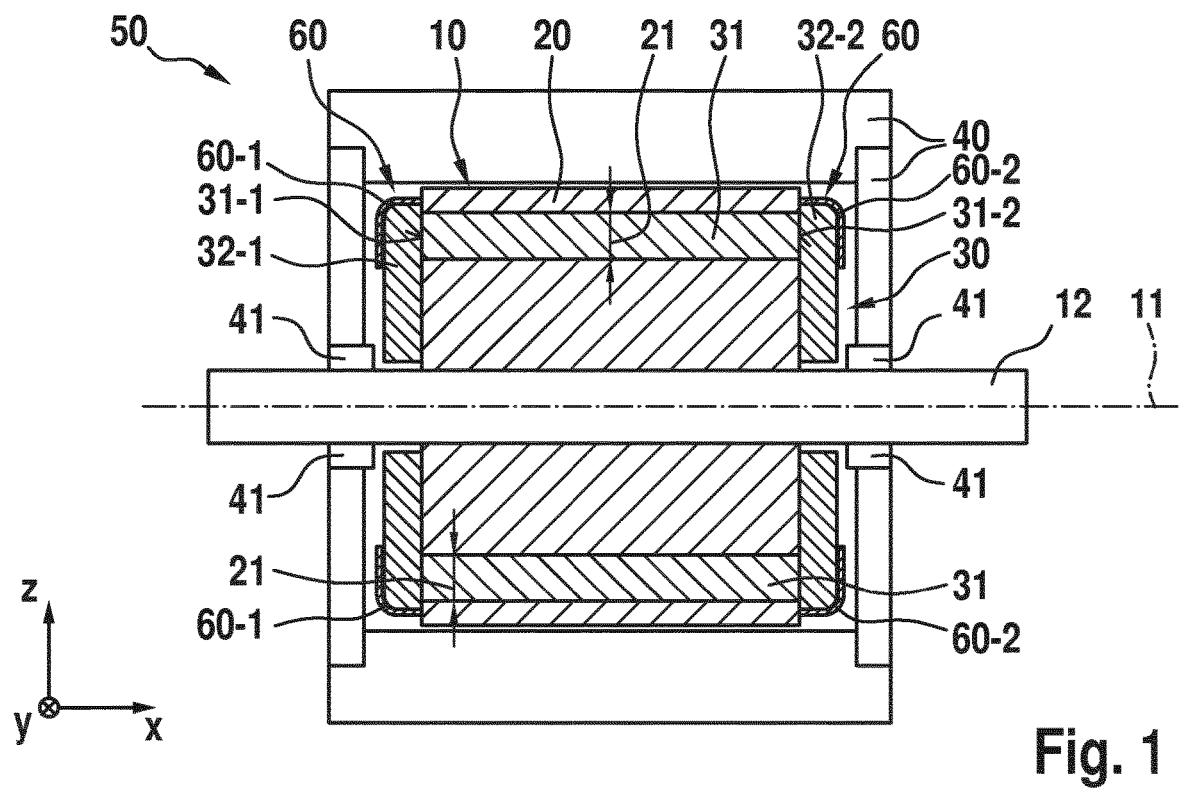
FIG. 1 is a schematic and partially sectional side view of the structure of an embodiment of an asynchronous machine according to the invention.

FIG. 1 shows a schematic and sectional side view of an embodiment of the asynchronous machine 50 according to the invention.

The asynchronous machine 50 is composed of a stator 40, in the interior of which a rotor 10 with a rotor shaft 12 is arranged mounted by way of bearings 41. The rotor shaft 12 defines a rotational axis 11 of the rotor 10. The individual components of the rotor 10 are connected in a rotationally fixed fashion to the shaft 12. The rotational axis 11, which is defined by means of the rotor shaft 12, is oriented parallel to the direction represented as the x-axis in FIG. 1.

The rotor 10 comprises, in addition to the rotor shaft 12, a laminated core 20 which is constructed from thin laminations which are electrically insulated from one another and are made, for example, from iron or the like. The laminated core 20 is constructed from a plurality of grooves 21 or recesses, here in the longitudinal direction parallel to the rotational axis 11, but an oblique profile is also contemplated, in which the individual laminations are rotated with respect to one another through at least a predefined inclination angle about the axis 11. The grooves 21 are equipped with rods 31, which are also referred to as cage rods. At the ends 31-1 and 31-2, the rods 31 are connected to short-circuit rings 32-1, 32-2—here at the ends—which are electrically conductive and as a result electrically short-circuited.

In the embodiment according to the invention of the asynchronous machine 50 according to FIG. 1, the rotor 10 according to the invention has, on the outer circumference of the first short-circuit ring 31-2, a first support ring 60-1 as part of a support ring arrangement 60.

Correspondingly, in the embodiment according to the invention of the rotor 10 according to FIG. 1, the second short-circuit 32-2, which is also constructed as an end ring like the first short-circuit ring 32-1, has a correspondingly constructed second support ring 60-2 as part of the support ring arrangement 60.

The first and second support rings 60-1 and 60-2 are coupled according to the invention to the respective short-circuit rings 32-1, 32-2 via a mechanical contact. For this purpose, either a respective short-circuit ring 32-1, 32-2 or a respective support ring 60-1, 60-2, or both, respectively have, in order to form the mechanical contact, a contour 33 or 61, which cannot be seen in the illustration in FIG. 1. According to the invention, the respective mechanical contact is constructed in the manner of a press-fit for a positively locking and/or a frictionally locking connection, specifically between the underlying short-circuit ring 32-1, 32-2 and the respective support ring 60-1, 60-2 which is provided on the short-circuit ring 32-1, 32-2.

In particular positive locking and/or frictional locking provide a particularly high level of stability of the short-circuit rings 32-1, 32-2 with respect to centrifugal forces during rotation about the rotational axis 11 by means of the rotor shaft 12.

Owing to the stabilization of the first and second short-circuit rings 32-1 and 32-2 by the support rings 60-1, 60-2 of the support ring arrangement 60, the selection of materials can be configured as desired with respect to the material of the short-circuit rings 32-1, 32-2 as long as electrical short-circuiting of the rods 31 is possible, in order, for example, to be able to allow better for aspects of a particularly lightweight and cost-effective configuration of the short-circuit rings 32-1, 32-2. Mechanical loading of the short-circuit rings 32-1, 32-2 can be taken up by the support rings 60-1, 60-2.

According to the invention it is, in particular, no longer necessary to construct the rods 31 and the short-circuit rings 32-1, 32-2 from the same material and/or in the same working step and with the same production methods.

Figure 2:
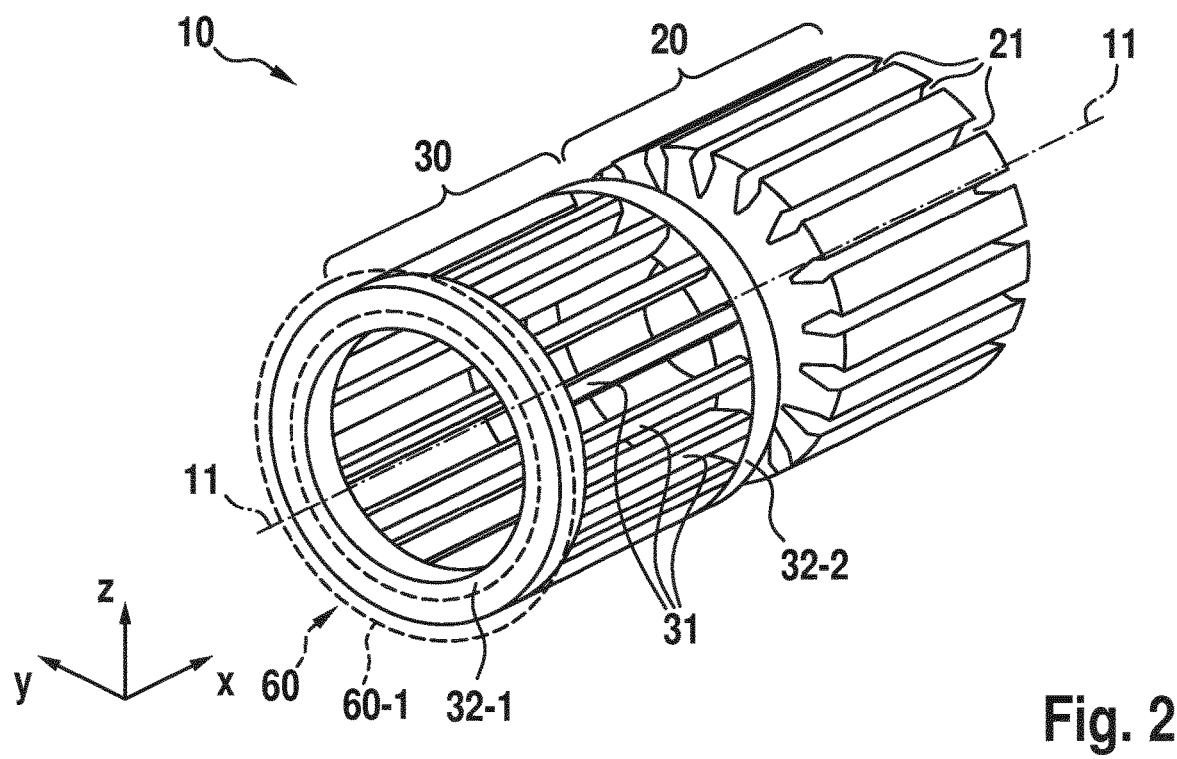
FIG. 2 is an exploded illustration of an embodiment of the rotor according to the invention which can be used as a short-circuit rotor for an asynchronous machine.

FIG. 2 shows, in the manner of an exploded illustration, an embodiment of the rotor 10 according to the invention with a short-circuit cage 30 (also known as a "squirrel" cage) with rods 31 and short-circuit rings 32-1 and 32-2 positioned at the ends, and with a laminated core 20 with grooves 21, constructed parallel to the rotor axis 11, for receiving the rods 31.

In the embodiment of the rotor 10 according to the invention according to FIG. 2, the laminated core 20 and the short-circuit ring 30 are shown explicitly in the exploded illustration. The support ring 60-1, to be provided according to the invention, of the support ring arrangement 60 is indicated only schematically, with a dashed contour, with respect to the first short-circuit ring 32-1.

Figure 3:
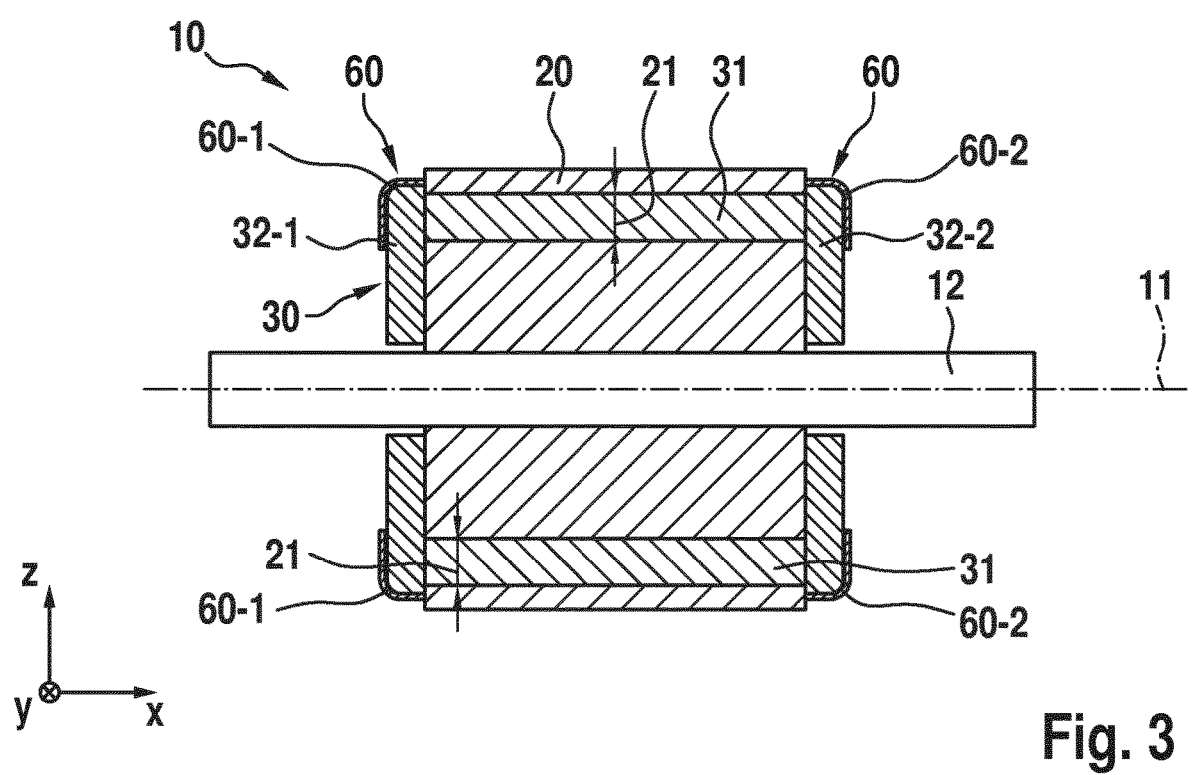
FIG. 3 shows a schematic and partially sectional side view of another embodiment of the rotor according to the invention.

FIG. 3 shows a schematic and sectional side view of an embodiment of a rotor 10 according to the invention. This corresponds essentially to the rotor 10 as is used in the embodiment of the asynchronous machine 50 according to the invention according to FIG. 1.

The rotor axis 11 is defined by a rotor shaft 12. The further components of the rotor 10 are connected in a rotationally fixed fashion to this rotor shaft 12. This involves, in particular, a laminated core 20 with grooves 21 which are constructed parallel to the rotor axis 11 or recesses in which rods 31 of a short-circuit cage 30 are received. The rods 31 are themselves connected in an electrically conductive fashion by their first ends 31-1 on the inside of a first short-circuit ring 32-1. The second ends 31-2, lying opposite the first ends 31-1, of the rods 31 of the short-circuit cage 30 are connected in an electrically conductive fashion to the inside of an end-positioned second short-circuit ring 32-2 lying opposite.

The embodiment of the rotor 10 according to the invention according to FIG. 3 respectively shows a first support ring 60-1 of the support ring arrangement 60 extending around the outer circumference on the first short-circuit ring 32-1, and a second support ring 60-2 of the support ring arrangement 60 on the second short-circuit ring 32-2.

The first and second support rings 60-1 and 60-2 are arranged according to the invention on the respectively assigned short-circuit ring 32-1, 32-2 by way of a mechanical contact contour 33, 61 in the manner of press-fit and, in particular in a positively locking and/or frictionally locking fashion and provide the respective short-circuit ring 32-1, 32-2 with a particularly high level of stability with respect to centrifugal forces in its rotation by means of the rotor shaft 12 about the rotational axis 11, in particular even in the case of untrue running.

Figure 3A:
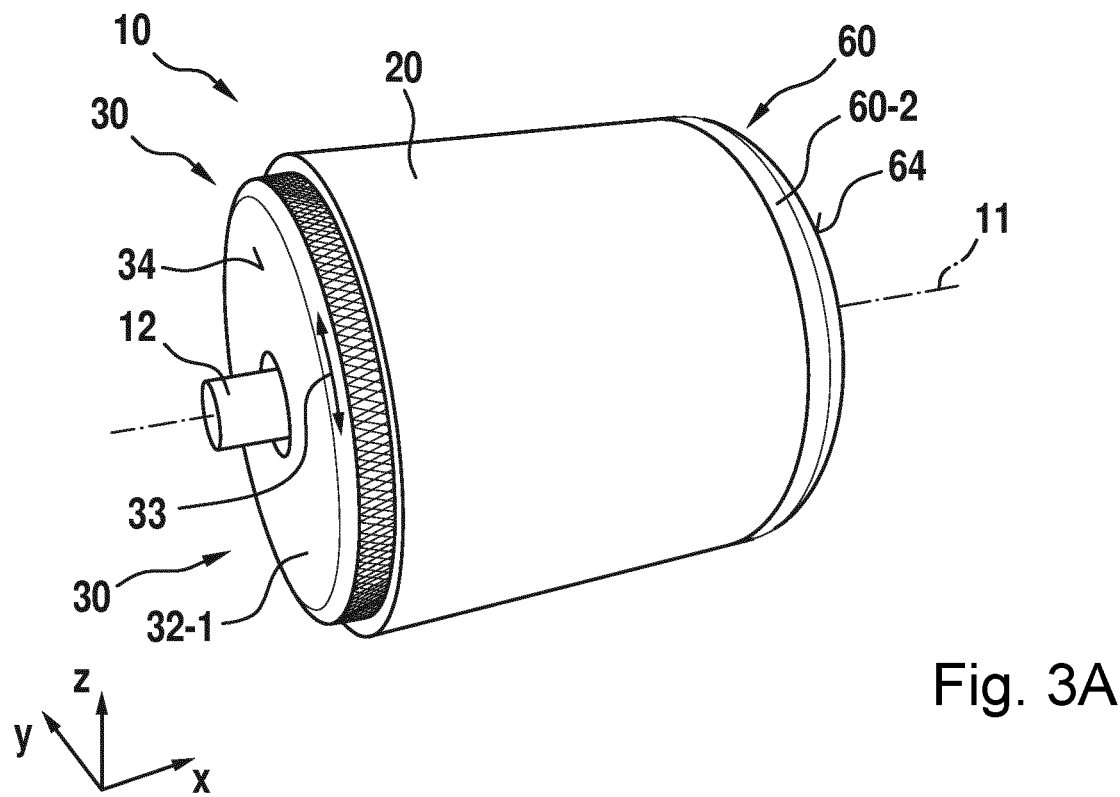
FIGS. 3A, 3B are schematic and partially sectional side views, respectively, of other embodiments of the rotor according to the invention.
Figure 3B:
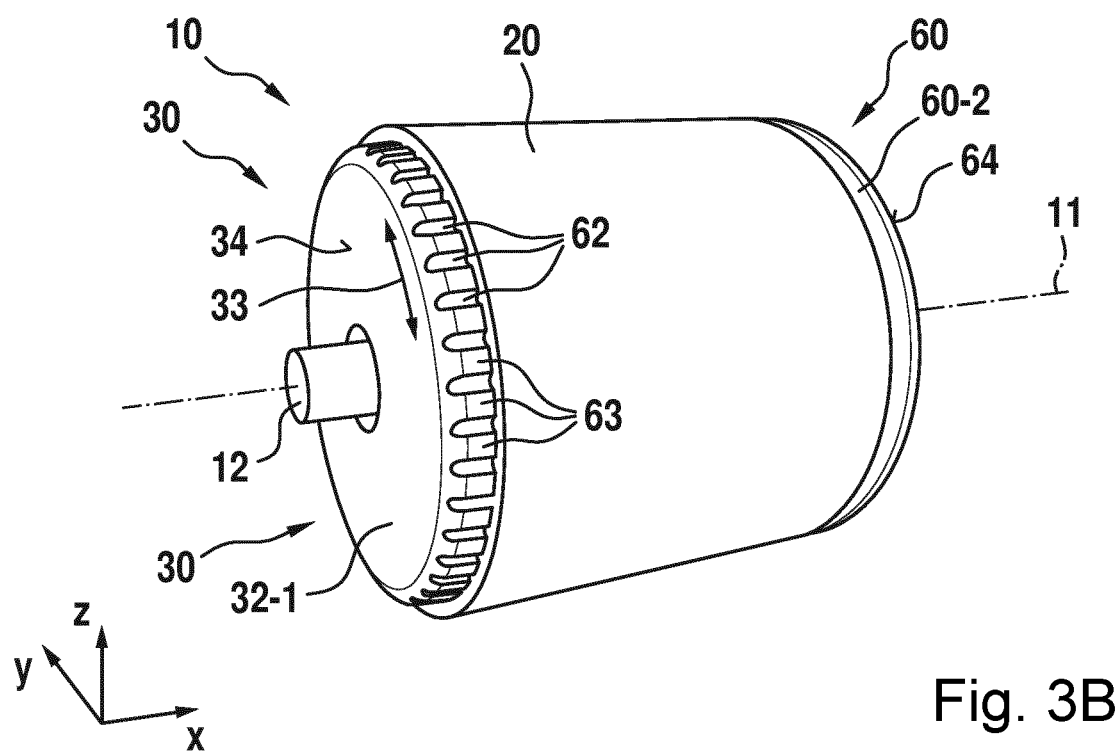

FIGS. 3A and 3B show embodiments of the rotor 10 according to the invention with specific refinements of the contour 33, here of a first short-circuit ring 32-1.

According to FIG. 3A, the contour 33 of the first short-circuit ring 32-1 is structured in the manner of knurling.

In an embodiment according to FIG. 3B, the contour 33 of the first short-circuit ring 32-1 has a sequence of axial recesses 62 and projections 63 which are arranged alternately along the outer circumferential face 34 of the first short-circuit ring 32-1.

Figure 4A:
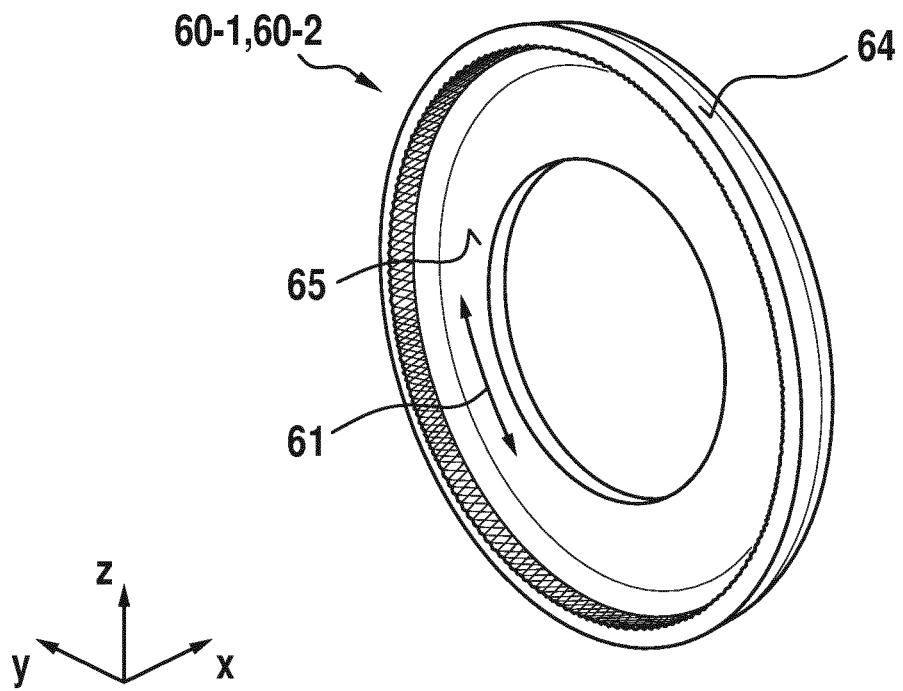
FIGS. 4A, 4B are perspective side views of two embodiments, respectively, for support rings which can be used according to the invention.
Figure 4B:
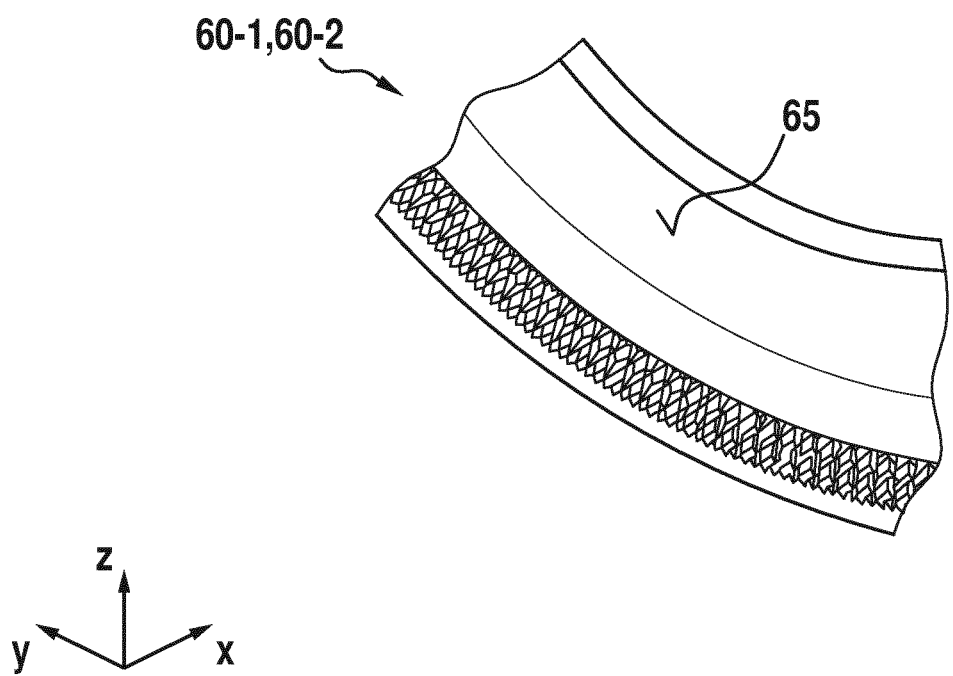

FIGS. 4A and 4B present embodiments of the support rings 60-1, 60-2 of the support arrangement 60 such as can be used in the configuration of a rotor 10 or of an asynchronous machine 50 according to the invention.

In order to improve the mechanical contact—in particular through frictional locking and/or through positive locking between a respective support ring 60-1, 60-2 and a respective short-circuit ring 32-1, 32-2—the inside 65 and/or the outside 64 can have a specific contour 61.

In the embodiments according to FIG. 1, the support rings 60-1, 60-2 have an overall smooth contour 61 both on the outside 64 and on the inside 65.

In the embodiment according to FIGS. 4A and 4B, the outside 64 is smooth, whereas the contour 61 of the inside 65 of the support ring 60-1, 60-2 is embodied in the manner of a knurling, which can be simultaneously constructed during the producing process of the respective support ring 60-1, 60-2 in an integral fashion.

Figure 5:
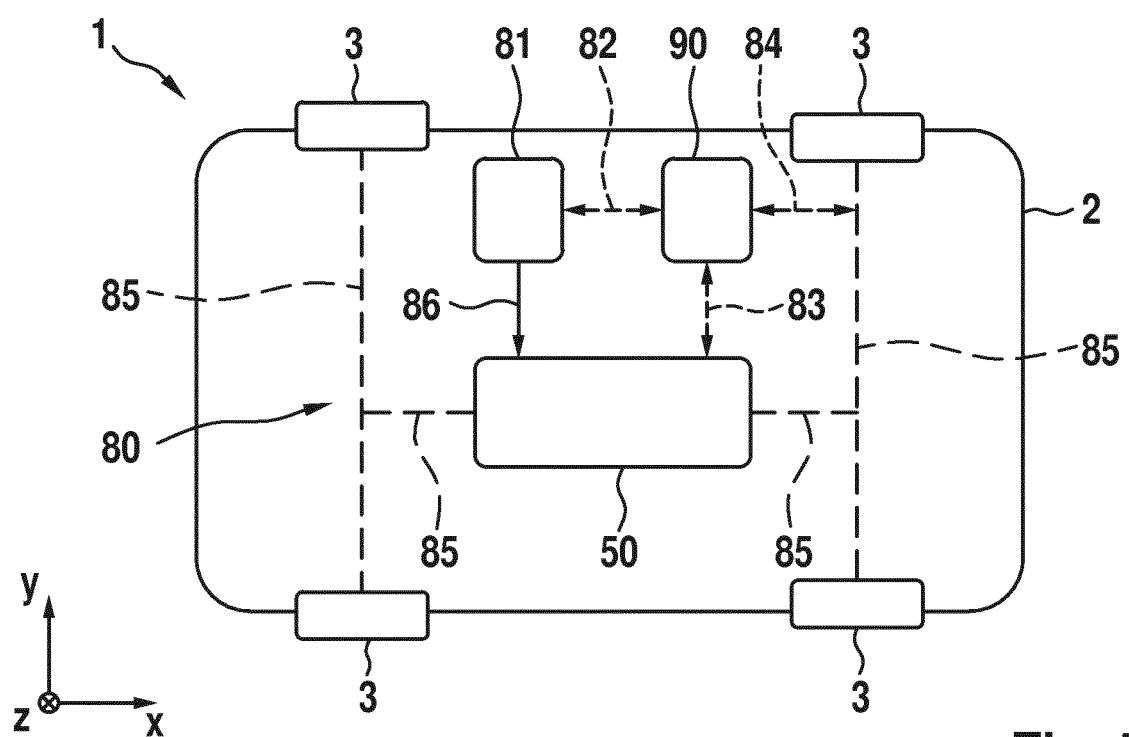
FIG. 5 is a schematic side view of a vehicle configured according to the invention.

FIG. 5 shows an embodiment of a vehicle 1 according to the invention, using an embodiment of the asynchronous machine 50 according to the invention for a drive 80.

In the schematic illustration in FIG. 5, the vehicle 1 according to the invention has a chassis 2 and four wheels 3 which can be driven via a drivetrain 85 by way of the asynchronous machine 50, constructed according to the invention, in order to propel the vehicle 1. In this context, the vehicle 1 according to the invention can be a purely electrically driven vehicle or a hybrid vehicle.

The inventive asynchronous machine 50 of the drive 80 is supplied by an energy source, in particular a battery 81, via a supply line 86. The function and operation of the battery 81, of the asynchronous machine 50 and of the drivetrain 85 are monitored and/or controlled by a control unit 90, via control/communication lines 82, 83 and 84.

This and further features and properties of the present invention are explained further with reference to the following illustrations.

The rotor 10 of an asynchronous machine 50, which is also referred to as a short-circuit rotor or cage rotor 30, is composed of an iron laminated core 20, comprising laminations which are insulated with respect to one another, and have punched-in grooves 21.

When asynchronous rotors 10 are produced, the short-circuit cage 30 with rods 31 and end rings 32-1, 32-2 can be introduced into the laminated core 20 via an aluminum die casting process.

The cast rotor rods 31 are provided on both sides with short-circuit rings 32-1, 32-2, and therefore form the electrically conductive short-circuit rotor 10.

The efficiency of the electric machine is improved by replacing the aluminum in the die casting process with another suitable material with a higher conductance value such as e.g. copper. The relatively low mechanical strength of the replacement material generally has a disadvantageous effect here.

At high rotational speeds or when there is a large rotor diameter, the short-circuit rings 32-1, 32-2 which are arranged at the axial ends of the laminated core 20 are subjected, owing to centrifugal forces, to the risk of mechanical deformation, as result of which the rotor 10 can be damaged or destroyed.

In order to counteract this, support rings 60 made of mechanically stable materials are used which absorb the centrifugal forces of the short-circuit ring 32-1, 32-2.

Methods for connecting the support rings to the end rings by bonding, welding or shrink-fitting are costly, expensive and mechanically disadvantageous:

(a) In the case of bonded support rings, mechanical processing is necessary in order to generate the bonding gap. Furthermore, the bonding point must be correspondingly pre-treated to remove impurities, e.g. by cleaning. After the bonding points have been cleaned, the bonding agent must be applied in a separate fabrication step, wherein the curing period delays the fabrication process. In conjunction with high temperatures, the bonding point is considered to be a weak point both for the connection itself and for the entire fabrication process, e.g. in mechanical terms.

(b) In the case of welded support rings, the selection of materials for the support ring and short-circuit rings 32-1, 32-2 is limited by the welding capability. The weld spots must be applied in a separate fabrication process. Welding devices which are necessary for this are expensive. Possible thermal stresses owing to the introduction of heat during the welding can cause warping of the components. The possibilities of the unbalanced positions on the rotor 10 can be limited by the weld seams.

(c) When support rings are fitted a press-fit is always necessary. Therefore, both the short-circuit ring 32-1, 32-2 and the support ring 60-1, 60-2 have to be fabricated very precisely. In order to join the parts, they must be treated thermally (cooling, heating) frequently.

In order to absorb the centrifugal forces of the short-circuit rotor 30 and, in particular, of the short-circuit rings 32-1, 32-2 and therefore to prevent damage, even at high rotational speeds, the invention proposes inter alia a new method for mounting the support ring 60-1, 60-2 of a support ring arrangement 60.

A respective support ring 60-1, 60-2 is not to be connected to a short-circuit ring 32-1, 32-2 by bonding, welding or with a press-fit, but instead by way of a suitable contour 33, 61 on the short circuit ring 32-1, 32-2 and/or on the support ring 60-1, 60-2. In this context, this can be done, for example, with a complementary opposing contour which is predefined during the casting of the short-circuit cage 30 in the casting mold.

Shaping of the short-circuit ring 32-1, 32-2, which has already been concluded, after the casting requires as a last working step only the fitting of the support ring 60-1, 60-2 onto the short-circuit ring 32-1, 32-2, e.g. at room temperature.

In contrast to a fitted-in support ring, relatively large fabrication tolerances are permissible here.

However, subsequent provision of a contour 33 on the short-circuit ring 32-1, 32-2 and/or of a contour 61 on the inside 65 of the support ring 60-1, 60-2 is also possible.

It is advantageous with this invention that the support rings 60-1, 60-2 are easily mounted by pressing on, e.g. at room temperature without additional auxiliary materials or costly pre-processing of the joints.

In addition, with the connection technology specified here the selection of materials is limited to a smaller degree. For example, non-metallic materials such as composite fiber materials or plastics can also be used. Owing to their relatively low density, these have considerable advantages for the overall weight of the rotor 10 and therefore of the electric machine.

The following inventive advantages are obtained:
(1) In contrast to the fitted-in support ring, according to the invention neither the short-circuit ring 32-1, 32-2 nor the support ring 60-1, 60-2 has to be processed to a precise fit size (no fit), and relatively large fabrication tolerances are therefore possible. This provides a saving in terms of time and costs.
(2) Additional fabrication steps such as welding, bonding and pre-processing of the bonding/weld points are dispensed with.
(3) Additional materials are not introduced and there are therefore no disadvantages in terms of strength.
(4) Flexibility of the selection of materials for the support rings 60-1, 60-2 because preconditions such as welding capability, compatibility with bonding agent etc are eliminated.
(5) No thermal deformations of the material of the short-circuit rings 32-1, 32-2 and of the support rings 60-1, 60-2 by virtue of joining at room temperature.
(6) Use of support rings 60-1, 60-2 made of lightweight and solid materials such as composite fiber materials is possible.

LIST OF REFERENCE NUMERALS

1 Vehicle
2 Chassis
3 Wheel
10 Rotor, cage rotor
11 Rotor axis
12 Rotor shaft
20 Laminated core
21 Groove, recess
30 Short-circuit cage
31 Rod
31-1 (First) end/rod end
31-2 (Second) end/rod end
32-1 (First) short-circuit ring
32-2 (Second) short-circuit ring
33 Contour of short-circuit ring 32-1, 32-2
34 (Convex) outside/outer face
35 (Concave) inside/inner face
40 Stator
41 Bearing
50 Asynchronous machine
60 Support ring arrangement
60-1 (First) support ring
60-2 (Second) support ring
61 Contour of support ring 60-1, 60-2
62 Recess
63 Projection
64 (Convex) outside/outer face
65 (Concave) inside/inner face
80 Drive
81 Battery
82 Control/communication line
83 Control/communication line
84 Control/communication line
85 Drivetrain
86 Supply line
90 Control unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A rotor for an asynchronous machine, comprising:
a laminated core; and
a short-circuit cage which is at least partially integrated into the laminated core, wherein
the short-circuit cage comprises
rods made with or from an electrically conductive material,
short-circuit rings made with or from a second electrically conductive material, and
a support ring constructed on at least one of the short-circuit rings in mechanical contact therewith, wherein
a respective short-circuit ring and/or a respective support ring has a contour for forming the mechanical contact,
a respective mechanical contact is constructed as a press-fit for positively locking and/or frictionally locking connection, and
the contour is constructed with a surface profile, including a plurality of recesses and a plurality of projections that are arranged alternately around an outermost surface of the respective contour for forming and supporting the mechanical contact, wherein all of the projections project radially outward from the outermost surface.
2. The rotor as claimed in claim 1, wherein
the respective support ring is constructed as a positively locking and/or frictionally locking structure, which is pressed onto the respective short-circuit ring.

3. The rotor as claimed in claim 1, wherein
the contour is constructed:
(a) entirely or partially as a structure which is integral with the respective support ring and/or with the respective short-circuit ring, and/or
(b) entirely or partially as a structure which has been subsequently added to the respective support ring and/or to the respective short-circuit ring.

4. The rotor as claimed in claim 1, wherein
the respective short-circuit ring and the respective support ring are constructed with contours which cooperate and/or are at least partially complementary to one another.

5. The rotor as claimed in claim 1, wherein
the respective support ring is constructed:
(a) with or from a material from the group of materials which comprises metallic materials, ceramic materials, plastics, composites, and combinations thereof, and/or
(b) with or from the same material as the respective short-circuit ring.

6. The rotor as claimed in claim 5, wherein
the respective support ring is constructed with or from glass materials and/or carbon fiber materials.

7. An asynchronous machine, comprising:
a stator; and
a rotor as claimed in claim 1.

8. A vehicle, comprising:
an asynchronous machine constructed as part of a drive and/or of a generator of the vehicle, wherein
the asynchronous machine comprises a rotor as claimed in claim 1.

9. The vehicle as claimed in claim 8, wherein
the vehicle is a passenger car, battery-powered electric vehicle and/or a hybrid vehicle.

10. A method for producing a rotor for an asynchronous machine, the rotor comprising a laminated core and a short-circuit cage which is at least partially integrated into the laminated core, the method comprising the acts of:
constructing the short-circuit cage with rods made with or from a first electrically conductive material, and short-circuit rings made with or from a second electrically conductive material, and a support ring constructed on at least one of the short-circuit rings in mechanical contact therewith; and
constructing a respective short-circuit ring and/or a respective support ring with a contour for forming the mechanical contact;
forming a respective mechanical contact as a press-fit for positively locking and/or frictionally locking connection; and
constructing the contour with a surface profile, including a plurality of recesses and a plurality of projections that are arranged alternately around an outermost surface of the respective contour for forming and supporting the mechanical contact, wherein all of the projections project radially outward from the outermost surface.

11. The method as claimed in claim 10, wherein
a respective support ring is constructed as a positively locking and/or frictionally locking structure, which is pressed onto the respective short-circuit ring.

12. The method as claimed in claim 10, wherein
a respective contour is constructed:
(a) entirely and/or partially as a structure which is integral with the respective support ring and/or with the respective short-circuit ring, and/or
(b) entirely and/or partially as a structure which has been subsequently added to the respective support ring and/or to the respective short-circuit ring.

13. The method as claimed in claim 10, wherein
a respective contour is constructed with a surface profile, including a plurality of recesses and a plurality of projections that are arranged alternately around an outer surface of the respective contour for forming and supporting the mechanical contact.

14. The method as claimed in claim 10, wherein
a respective short-circuit ring and a respective support ring are constructed with contours which cooperate and/or are at least partially complementary to one another.

15. The method as claimed in claim 10, wherein
a respective support ring is constructed:
(a) with or from a material from the group of materials which comprises metallic materials, ceramic materials, plastics, composites, and combinations thereof, and/or
(b) with or from the same material as the respective short-circuit ring.

16. The method as claimed in claim 15, wherein
the respective support ring is constructed with or from glass materials and/or carbon fiber materials.

\* \* \* \* \*